United States Patent [19]
Adler

[11] 3,923,398
[45] Dec. 2, 1975

[54] APPARATUS AND METHOD FOR FLAME ATOMIZATION

[75] Inventor: Leonard Adler, White Plains, N.Y.

[73] Assignees: Trace Metals Instruments, Inc., New York, N.Y.; Itek Corporation, Lexington, Mass.

[22] Filed: Feb. 6, 1974

[21] Appl. No.: 440,253

[52] U.S. Cl. .................. 356/85; 356/87; 356/246; 356/111; 350/160 R
[51] Int. Cl.² ..... G01J 3/02; G01B 9/02; G02B 5/23
[58] Field of Search ................. 356/85–87, 356/246; 356/106, 107, 109, 110, 111; 350/160 R, 161, 299

[56] References Cited
UNITED STATES PATENTS

| | | | |
|---|---|---|---|
| 3,381,571 | 5/1968 | Vallee et al. | 356/87 |
| 3,463,572 | 8/1969 | Preston, Jr. | 350/161 |
| 3,484,650 | 12/1969 | Rendina | 356/85 X |
| 3,527,537 | 9/1970 | Hobrough | 356/106 R |
| 3,632,214 | 1/1972 | Chang et al. | 356/106 R |
| 3,702,219 | 11/1972 | Braun et al. | 356/87 X |
| 3,708,228 | 1/1973 | Delves | 356/87 |
| 3,836,256 | 9/1974 | Peters | 356/109 |

OTHER PUBLICATIONS

Zink, *Applied Spectroscopy*, Vol. 13, No. 4, August 1959, pp. 94–97.
Delves, *Analyst*, Vol. 95, May 1970, pp. 431–438.
"Deformable Optical Elements With Feedback;" Horace Babcock, JOSA Vol. 48, No. 7, July 1958.
Wyant; "Double Frequency Lateral Shear Interferometer;" 12 Applied Optics, 2057; 9/73.

*Primary Examiner*—Vincent P. McGraw
*Assistant Examiner*—F. L. Evans
*Attorney, Agent, or Firm*—Robert L. Stone; Homer O. Blair; Robert L. Nathans

[57] ABSTRACT

Procedure for atomizing a micro-sample in solution by placing the micro-sample solution in a container having an axial hole therein, allowing gases typically from flame or plasma, to contact the container and pass through the axial hole to volatilize the micro-sample and atomize metal therein to form metal atoms. The metal atoms formed can be analyzed, typically by spectrometric means.

15 Claims, 6 Drawing Figures

APPARATUS AND METHOD FOR FLAME ATOMIZATION

This invention relates to an apparatus and method for atomizing metals, including metals volatilized at very high temperatures. Molecules of the metals emit or absorb specific radiation characteristics which can be subjected to analysis.

Flame and plasma spectrometric analysis is employed when elements of analytical interest are partially or wholly converted to atoms. Atomization is then followed by a spectro-metric measurement of absorbed, emitted or fluorescent radiation. The atomization process is usually carried out by aspirating the sample, particularly into a flame; but more recently, several micro-procedures have been introduced in which the micro-sample, typically less than 100 micro liters of sample solution, is used. These procedures include collecting the liquid sample on a loop and inserting the loop into a flame, placing the sample on a heated carbon rod or tantalum strip and inserting it into a heated graphite furnace. In another technique sample for analysis is placed on a metal cup which is placed in a cup-supporting loop and the loop and cup are inserted into a flame. Typically a cylindrical absorption tube is mounted horizontally in a flame directly above the inserted position of the cup. This tube has an entrance hole immediately above the cup and is opened at both ends, so that flame gases pass through the tube without directly contacting the micro-sample. In use, sample for analysis, say a 50 micro-liter solution of a lead salt, is dispensed into a cup and dried at 100°C for 10 minutes. Techniques are also known in which the sample is excited or atomized by plasma instead of flame.

When the cup is inserted into a flame or plasma, volatile compounds, such as lead compounds, in the cup volatilize into the flame or plasma gases and are then reduced to atoms, such as lead atoms. An atomic absorption spectrometer, measures the concentration of atoms which enter the absorption tube. In their present state of development micro-sample cup techniques have the advantages of (a) using relatively large and easily handled micro-sample; (b) carrying out sample preparation away from the spectrometer, if desired; (c) carrying out sample preparation in the cup, thus reducing the risk of contamination; (d) using a flame or plasma atomization process. It has the major disadvantage of only being applicable to a limited number of relatively volatile elements such as lead, cadmium and zinc. Furthermore, it is desirable that such presently known cups be precisely positioned with regard to the flame (or plasma) and absorption tube entrance hole.

It is the aim of the present invention to provide an apparatus and method for atomization which can be followed by spectrometric analysis in which a large range of elements can be atomized and analyzed using micro-samples. Atomization is typically done by flame or plasma. It is a further aim of the invention to provide an apparatus and method for flame or plasma atomization in which samples are placed in a container prior to insertion into a flame so that sample pre-treatment can be carried out away from the spectrometer.

It is the further aim of the invention to provide a method for atomization in which samples placed in the container are heated in the step-wise fashion by two or more flames, allowing combustion and elimination of organic materials prior to volatilization and atomization of elements of analytical interest. It is a further aim of the invention to provide an apparatus and method for flame atomization in which the sample is placed in an axially holed cup which can be heated to a higher temperature than an unholed cup, resulting in more efficient sample atomization. It is a further aim of the invention that precise positioning of the container with regard to the flame or plasma and the absorption tube is not necessary.

Other aims of the invention will be apparent and consideration of the following specification.

In accordance with certain of its aspects, this invention is directed to a method for atomization comprising the steps of placing a micro-sample containing metal compounds in a container therefor which has an axial hole therein which allows hot gases to flow therethrough to directly contact the micro-sample, thereby permitting said gases to pass through said axial hole and volatilize said micro-sample thereby atomizing metal therein and forming metal atoms.

The container may be formed of nickel, ceramic (e.g., aluminum oxide), stainless steel or carbon, an axial hole provided therein to permit the direct contact of gases with the micro-sample of metal in the container.

In the following specification, flame means are principally described as the medium for treating micro-sample. Plasma treatment is also described.

Some of the embodiments of the invention shall be described by illustrative example only, with reference to the following drawings; in which FIG. 1 is a schematic cross-sectional view of a sample container containing an axial hole, FIG. 2 is a schematic cross-sectional view of an alternative type of sample container containing an axial hole;

Figure 1:
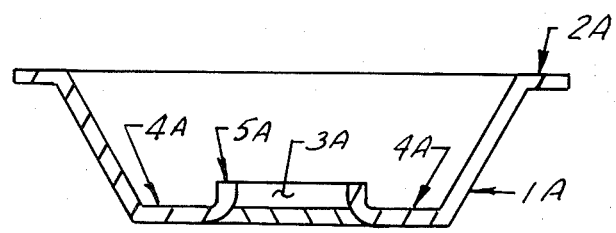

Referring now to FIG. 1 of the drawings, this shows a cross-section of a circular or conical sample container 1A, typically fabricated from nickel, ceramic, stainless steel or carbon, and typically 0.005 – 0.15 inch, say 0.008 inch thick and typically 0.25 – 0.50 inch, say 0.4 inch diameter. Sample atomization may be enhanced when the cup is fabricated from carbon. The container is fitted with a lip or other projections 2A for support, and an axial hole of diameter of 0.05 – 0.8 inch say 0.125 inch, 3A which allows gases to pass through this hole containing sample material inside the cup. The cup is optionally fixed with an inner lip 5A, typically made of the same material as the cup, to prevent sample flowing through the hole 3A during sample preparation.

The cup may be used with a stiff flame such as that generated from a capillary burner. Other flames may be used but the stiff flame is not as easily deflected as the flame generated from a triple-slot burner, with optimization of axial hole diameter flow through 3A will result. In operation, sample solution is dispensed into the container 1A. The sample is ashed or dried, for instance, by weighing tissue into the container, adding concentrated nitric acid and heating at 110° C. for 10–30 minutes, leaving ashed or dried sample 4A adhering to the inside walls of the container. The container is then placed in a loop and inserted into the flame (as in FIG. 4).

The cup is heated by flame or plasma and the gases pass through the hole 3A contacting sample 4A. The heating effect volatilizes compounds of volatile metals, such as lead, cadmium, zinc, arsenic, selenium, mercury, or thallium, and the combined heating effect and reducing properties of the gases promote atomization and volatilization of less volatile elements, such as copper, iron, manganese, silver, chromium, cobalt, or nickel. The holed cups are more efficiently heated in a flame than unholed cups. For example, in one experiment using an air acetylene flame, an unholed cup reacted a maximum temperature of 1070° C, a whole holed cup of the same dimensions (except for the hole) reached a temperature of 1100° C.

Figure 2:
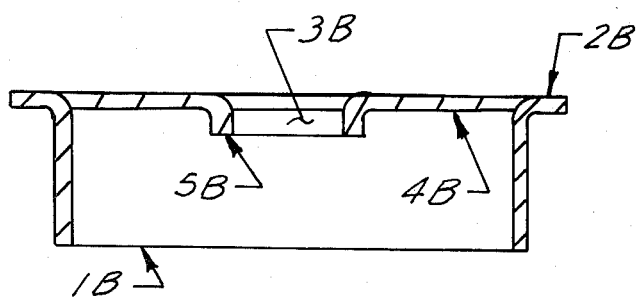

FIG. 2 shows another embodiment of the invention. Container 1B is fitted with supporting lugs, a ring 2B, an axial hole 3B, and optionally an inner lip 5B. In use, the container is inverted with hole 3B low. Sample solution is dispensed into the container which is then ashed or dried, typically at 110°C. for 10–30 minutes, leaving sample 4B adhering to the inside walls of the container. The container is picked up, inverted, so that hole 3B is high, placed on a supporting loop and inserted into a flame or plasma. The flame or plasma heats the container and also comes into direct contact with the sample, thus facilitating reduction of the elements of interest to atoms which can be analyzed.

Figure 3:
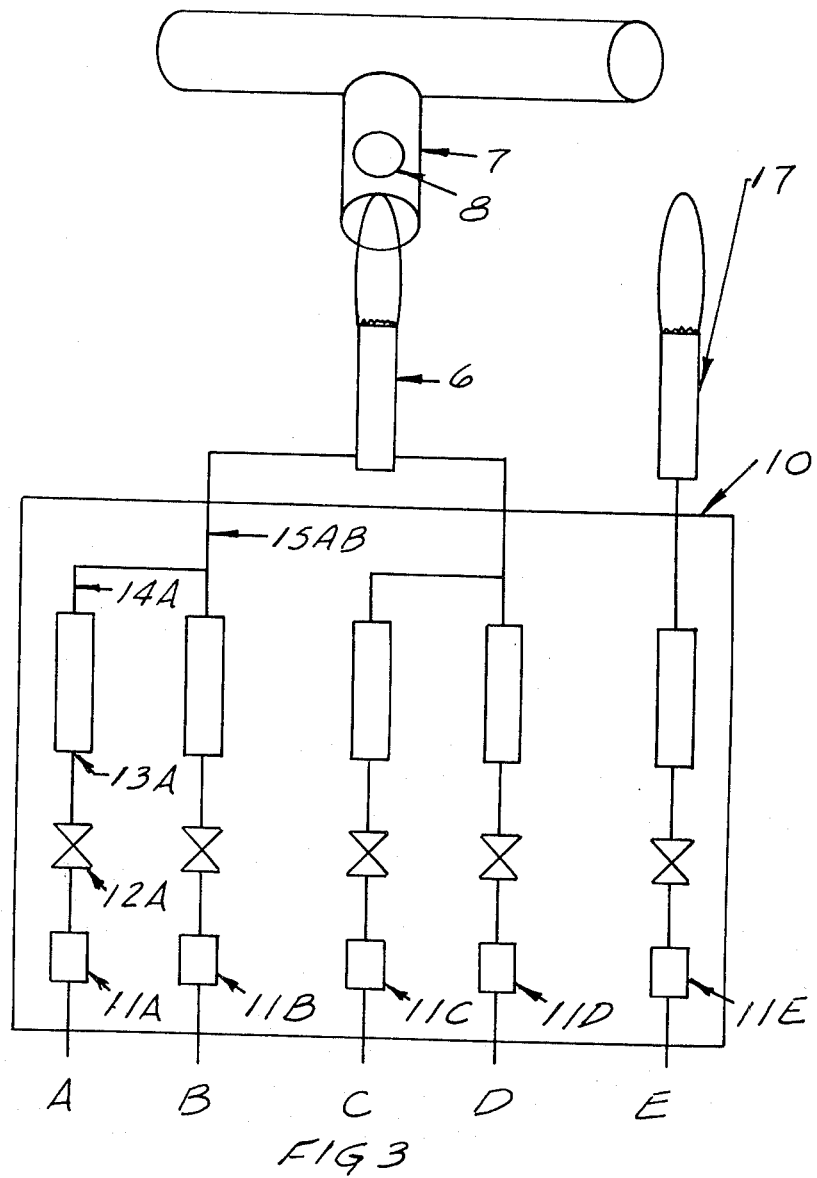
FIG. 3 is a schematic diagram of a switched flame gas control box and flame configuration.

Referring now to FIG. 3 of the drawings, a burner 6, typically a capillary burner or other burner giving a stiff flame, is mounted below the vertical leg of a T-shaped absorption tube 7, fitted with an aperture 8, through which a container, supported by a loop, can be inserted. Flame gases, typically air, acetylene, and nitrous oxide are fed through a gas control box 10. Air is fed along path A comprising the solenoid valve 11A, flow controller 12A, flow meter 13A, and tubing 14A to a T-junction, and then tubing 15AB to the burner 6. Nitrous oxide is similarly fed along path B. Acetylene at flow rate Fc is fed along path C and acetylene at flow rate Fd is fed along path D. The gas control box is also fitted with a path E to feed an inert gas to a second gas emission device 17. A horizontally placed absorption tube may be used instead of the T-shaped absorption tube. Such a horizontally placed tube has an entrance hole therein to receive volatilized material and gases. Since the gases pass through the axial hole of the container, it is not necessary that the container be placed essentially in the T-shaped absorption tube or centrally below the entrance hole of the horizontally placed tube. Atomized metal may be spectrometrically measured, preferably through an absorption tube positioned horizontally above the container or through the horizontal leg of a T-shaped absorption.

Figure 4:
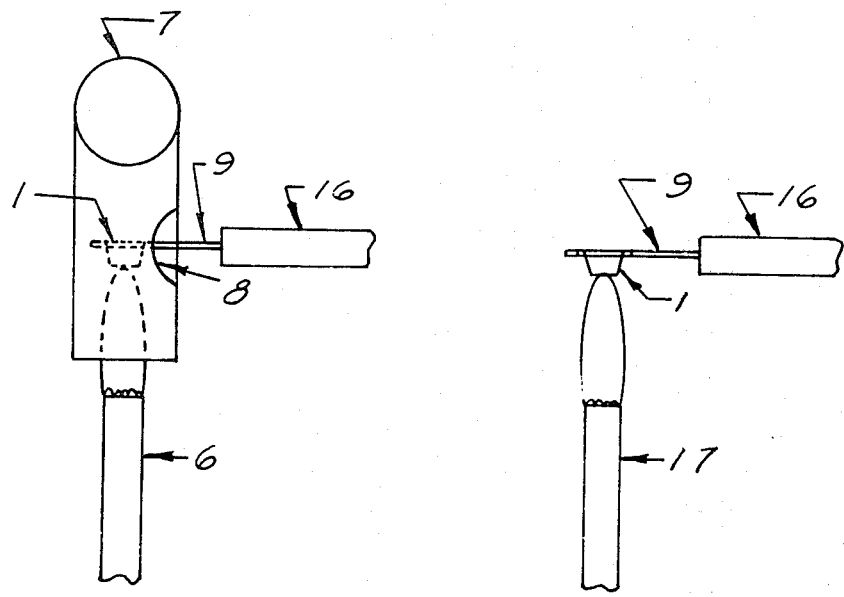
FIG. 4 shows a schematic diagram of the container injection.

Referring now to FIG. 4, this shows container 1 (which has an axial hole) supported by loop 9, mounted on a metal rod 16, typically a chrome-nickel alloy, inserted through aperture 8 of the absorption tube 7 in contact with flame gases from burner 6. The sytem is also fitted with a separate second gas-emitting device 17, such as an open tube through which an inert gas can flow. The gas control box is also fitted with timing and switching circuitry to control the operation of solenoid valves 11A, 11B, 11C, and 11E (FIG. 3). The micro switch is fitted so that it is triggered when container 1 is inserted into the flame gases.

In operation, the air flow through path A and acetylene flow rate through path C are set so as to support an air-acetylene flame at burner 6. The nitrous oxide flow (path B), and acetylene flow (path D) are set so as to support a nitrous oxide/acetylene flame, also at burner 6. A suitable flow rate for the inert gas, typically nitrogen, through gas emission device 17 is also selected. With the container 1 outside of absorption tube 7, valves 11A and 11C are opened and air/acetylene flame is lit and allowed to stabilize, typically at about 1800°C. up to about 2200°C. and the container is then inserted into the flame triggering the micro switch. In the flame, organic material is burnt off and volatile elements such as lead, cadmium, and zinc atomize at temperatures typically below 1000°C. A preselected time elapses after the micro switch is triggered, valves 11A and 11C close, and valves 11B and 11D simultaneously open. This switches to a second flame, typically nitrous oxide/acetylene which is hotter than the first flame, typically above about 2200°C. up to about 2600°C. and further elements such as copper, iron and manganese are volatilized at temperatures above about 1000° C. The use of this switched flame is a particularly desirable feature of the invention and minimizes the time during which components such as the T-shaped absorption tube are exposed to the second high temperature flame, thus conserving component life. It also insures that elements such as lead are not volatilized and atomized at the same time as organic material is burning, as could occur with only the nitrous oxide/acetylene or other very hot flame. After a further elapsed time selected by the operator, the container is withdrawn from the flame. This optionally opens valve 11E, allowing inert gas (e.g., nitrogen) to flow over the container 1 while it is cooling.

Figure 5:
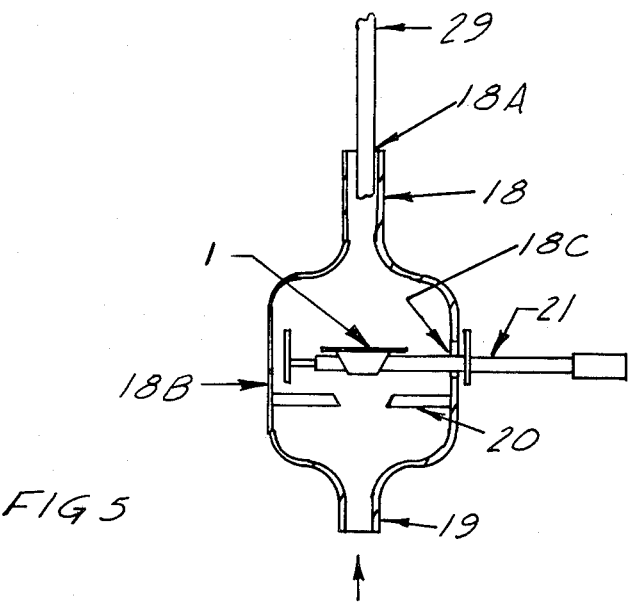
FIG. 5 is a schematic cross-sectional view of an apparatus for analysis by plasma emission, absorption or fluorescence spectrometry.
Figure 6:
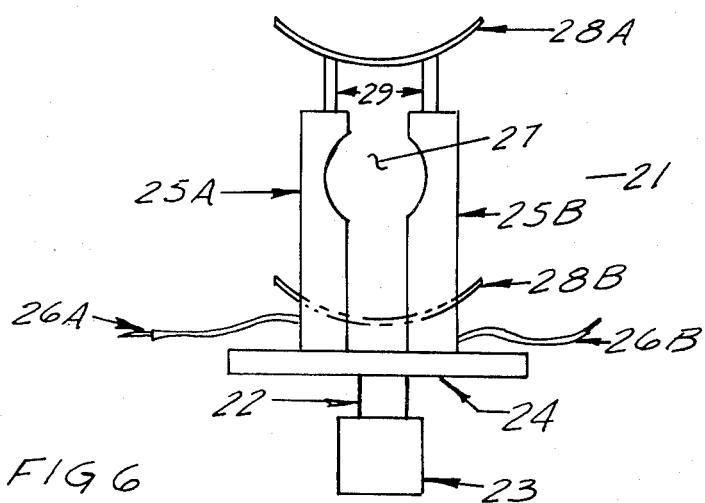
FIG. 6 is a schematic diagram of a simple injector unit for use with the apparatus of FIG. 5.

Referring now to FIG. 5, this shows a typical plasma jet comprising a silica tube 18 through which a gas, typically an inert gas such as argon flows at a rate of 0.2–5 liter per minute, typically 1 liter per minute. This gas is fed from an appropriate container and flow regulating devices (not shown) through entrance port 19. The silica tube 18 is placed inside a plasma excitation device (not shown) such as a micro-wave cavity operating at 50–5,000 W, typically 75 W and at a frequency of 10–3,000 MHz, typically 2,450 MHz. The silica tube is typically shaped as shown, with a narrow bore exit port 18A of 0.5–2 cm, say 1 cm diameter, to produce a corresponding plasma jet. It also has a broader section 18B of sufficient diameter to enclose part of the sample injection mechanism. The intensity of emitted, absorbed or fluorescence radiation from the plasma is measured by a spectrometer (not shown). The silica tube 18 is also fitted with a baffled or limiting orifice 20 to restrict the flow of gases so that they pass substantially only through the holed container 1. A sample heating and injection mechanism 21 is also fitted into the tube 18 through hole 18C. This is shown more clearly in FIG. 6. Referring now to this figure, the injection mechanism comprises an injection rod 22 and knob 23 mounted on an insulator plate 24. On the other side of this plate two electrodes 25A and 25B are fitted. These are connected via leads 26A and 26B to an electrical power supply (not shown) capable of passing large low voltage currents, typically 0–100 amp at 0–10 volt. The electrodes are shaped so as to enclose a holed container 1 (not shown in FIG. 6) at the electrical power supply. The injector is also fitted with two baffles 28A and 28B respectively. These baffles are supported as required for example baffle 28A is supported by rods 29, and are shaped so as to conform to the shape of the wall of tube 18. Container 1 is typically fabricated from nickel, a conducting ceramic, stainless steel or carbon; electrodes are typically fabricated from carbon or tantalum. Alternative electrode designs could include an arrangement with one electrode permanently mounted in the tube 18 and with a second movable electrode mounted on the injector unit 21.

In operation, the injector unit is placed in the "out" position, with baffle 28A contacting the wall of tube 18, substantially preventing gas flow through hole 18C. Gas is allowed to flow through tube 18, microwave or radio frequency power is applied to the upper portion of tube 18, and a plasma is ignited by applying a spark discharge. The plasma is formed inside tube 18 and emerges as a jet 29. It is operated for 5–30 minutes, say 10 minutes, prior to measurement to allow it to stabilize. Sample for analysis, typically a blood serum, water or other liquid sample or a semi-solid sample such as homogenized fruits, vegetables, baby foods or solid samples such as fertilizers or suspended particulates in water, is dispensed into container 1. For a liquid sample 5–200 microliters, typically 50, is dispensed into the container. This is then placed in an oven at 50°–130°C, say 110°C, for 5–30 minutes, say 10 minutes, to dry off solvent. The sample is optionally subjected to further treatment such as dry ashing or wet digestion as required, finally dried as necessary to remove added solvent then placed in the injector unit 21. The injector unit is pushed to the "in" position, placing the cup immediately above the axial hole in baffle 20 and pushing baffle 28B into position to cover hole 18C. This movement will result in some air being admitted into tube 18 to a temperature of up to 2000° C as selected by selecting the applied voltage disturbing the plasma. After a delay of 1–10 seconds, say 5 seconds, to allow the plasma to restabilize, electrical current is passed through electrodes 25A and 25B, heating container 1. This will volatilize the elements of analytical interest, and the resulting vapor will be picked up by the gas stream passing through baffle 20 and carried to the plasma. Here atom concentration is measured by measuring the transient absorption, emission or fluorescence signal. After measurement is complete, the injector is moved to the "out" position, container 1 is moved, and the cycle repeated with the next sample.

This apparatus has the following advantages:
1. Solvent is readily removed from the sample prior to its introduction into the plasma. This is particularly important since solvents will prevent formation of a stable plasma.
2. Passage of gas through the hold container will ensure efficient and reproducible collection of sample vapor and passage to the plasma.
3. Use of baffles 28A and 28B will ensure minimal introduction of air into the inert gas stream, hence minimal disturbance and instability of the plasma.

The following example is set forth by way of illustration and does not serve to limit the invention to the specific aspects set forth therein:

EXAMPLE

Fifty microliters of a tissue homogenate believed to contain a lead compound and a manganese compound are placed through a pipette into a conically shaped aluminum oxide ceramic cup having a thickness of 0.040 inch and a diameter of 0.4 inch. The cup has an axial hole of diameter 0.15 inch on its lower surface and is fitted with an inner lip made of aluminum oxide ceramic. Support projections are present around the upper circumference of the cup. The sample is then ashed by adding 100 microliters of concentrated nitric acid and heating at 110°C. for 30 minutes. The cup is then supported on a chrome-nickel alloy loop mounted on a metal rod and inserted through an aperture in the vertical leg of a T-shaped absorption tube through the vertical leg of which stiff flame gases from a capillary burner rise into contact with the cup and through the axial hole thereof. The gases are an air/acetylene mixture of the temperature of about 1800° C. to about 2200° C. Lead is thereby atomized and its presence in the flame gases determined spectrometrically through the horizontal leg of the T-shaped absorption tube. A micro switch associated with the burner is then triggered and the flame is switched to a higher temperature up to about 2600° C., with a nitrous oxide/acetylene gas mixture, thereby atomizing manganese, the presence of which in the flame gases is determined spectrometrically through the horizontal leg of the T-shaped absorption tube.

The cup is then withdrawn from the flame and the burner is switched to a separate gas feed which provides inert nitrogen gas in contact with the cup and loop as it cools.

Additional illustrative embodiments will be apparent to one skilled in the art, from the foregoing disclosure.

I claim:

1. A method for atomization comprising placing a micro-sample containing metal compound in a cup having an axial hole therein, heating said cup with hot gases and passing said gases through said axial hole into contact with said micro-sample, thereby volatilizing said micro-sample and atomizing metal therein.

2. The method for atomization claimed in claim 1, wherein said container is a cup formed of a material selected from the group consisting of nickel, ceramic, stainless steel, and carbon.

3. The method for atomization claimed in claim 2, wherein said cup has supporting projections upon which a loop is fitted for placing said cup over said gases.

4. The method for atomization claimed in claim 2, wherein said gases are flame gases.

5. The method for atomization claimed in claim 4, wherein a capillary burner is placed below said cup and is lit to provide a stiff flame of said flame gases.

6. The method of atomization claimed, in claim 5, wherein an air/acetylene mixture is initially flamed and said flame is then switched to a nitrous oxide/acetylene mixture flame at a higher temperature than the flame from said air/acetylene mixture; wherein the flame from said air/acetylene mixture atomizes a metal selected from the group consisting of lead, cadmium, zinc, arsenic, selenium, mercury, and thallium in said micro-sample and the flame from said nitrous oxide/acetylene mixture atomizes a metal less volatile than the aforesaid metals selected from the group consisting of copper, iron, manganese, silver, chromium, cobalt and nickel.

7. The method of atomization claimed in claim 6, wherein said cup is withdrawn from the flame after atomization occurs with said nitrous oxide/acetylene flame and is placed in contact with a stream of inert gas.

8. The method of atomization claimed in claim 2, wherein said cup is in a plasma jet which is inside a plasma excitation device and gases are converted into a plasma by said plasma excitation device operating at 50–5,000 W and a frequency of 10–3,000 MHz.

9. The method of atomization claimed in claim 2, wherein said metal which is atomized includes at least one metal selected from the group consisting of copper, iron, manganese, silver, chromium, cobalt, and nickel.

10. The method of atomization claimed in claim 2, wherein an absorption tube is positioned with an opening therein horizontally above said cup and gases and said gases and atomized metal pass into said opening and said atomized metal is spectrometrically analyzed through said absorption tube.

11. The method of atomization claimed in claim 2, wherein said cup is fitted with an inner lip to prevent micro-sample flow through said axial hole.

12. A micro-sample atomization cup having an axial hole therein, said cup being formed of a material selected from the group consisting of nickel, ceramic, stainless steel and carbon.

13. The micro-sample atomization container claimed in claim 12, wherein said cup has supporting projections for fitting a loop.

14. The micro-sample atomization container claimed in claim 13, wherein said cup is fitted with an inner lip to prevent flow of micro-sample through said axial hole.

15. The micro-sample atomization container claimed in claim 13, wherein said supporting projection supports said cup, being an inverted position.

* * * * *

UNITED STATES PATENT OFFICE
CERTIFICATE OF CORRECTION

Patent No. 3,923,398    Dated December 2, 1975

Inventor(s) Leonard Adler

It is certified that error appears in the above-identified patent and that said Letters Patent are hereby corrected as shown below:

Patent cover page:
    Item 73: Change "Assignees: Trace Metals Instru-
              ments, Inc. New York, N.Y.; Itek
              Corporation, Lexington, Mass." to
              --Assignee: Trace Metals Instruments, Inc.
              New York, N.Y.--

Item 56: Delete the following from among the
              references cited:
              "3,463,572  8/1969  Preston, Jr.....350/161
               3,527,537  9/1970  Hobrough........356/106R
               3,632,214  1/1972  Chang et al.....356/106R
               3,836,256  9/1974  Peters..........356/109
              "Deformable Optical Elements With Feedback;"
              Horace Babcock, JOSA Vol. 48, No. 7,
              July 1958.
              Wyant; "Double Frequency Lateral Shear
              Interferometer;" 12 Applied Optics, 2057;
              9/73."

Attorney, Agent, or Firm: Change "Robert L. Stone;
            Homer O. Blair; Robert L. Nathans." to
            --Robert L. Stone--

Signed and Sealed this ninth Day of March 1976

[SEAL]

Attest:

RUTH C. MASON
*Attesting Officer*

C. MARSHALL DANN
*Commissioner of Patents and Trademarks*